(12) United States Patent
Lin

(10) Patent No.: US 7,985,041 B2
(45) Date of Patent: Jul. 26, 2011

(54) SYMMETRICALLY STEPPED BORE COUPLER NUT

(75) Inventor: Jin-Jie Lin, Livermore, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 256 days.

(21) Appl. No.: 12/247,996

(22) Filed: Oct. 8, 2008

(65) Prior Publication Data

US 2010/0086378 A1 Apr. 8, 2010

(51) Int. Cl.
*F16B 37/00* (2006.01)

(52) U.S. Cl. .......................... 411/427; 411/388

(58) Field of Classification Search ................. 411/427, 411/388; 403/43, 44, 299; 285/390, 12
See application file for complete search history.

(56) References Cited

U.S. PATENT DOCUMENTS

| | | | | |
|---|---|---|---|---|
| 838,448 A * | 12/1906 | Pitcher | ............................ | 403/43 |
| 887,864 A | 5/1908 | Steese | | |
| 991,517 A * | 5/1911 | Kennedy | ......................... | 52/708 |
| 994,441 A * | 6/1911 | Burk | .............................. | 362/457 |
| 1,313,450 A * | 8/1919 | Beals | ................................ | 403/44 |
| 1,804,290 A * | 5/1931 | Tschappat | ....................... | 285/12 |
| 2,371,121 A * | 3/1945 | Basquin | ......................... | 411/427 |
| 2,914,332 A | 11/1959 | Cervini | | |
| 3,960,047 A * | 6/1976 | Liffick | .......................... | 411/429 |
| 4,266,813 A * | 5/1981 | Oliver | ............................ | 285/12 |
| 4,712,812 A * | 12/1987 | Weir, III | .................. | 285/148.23 |
| 6,367,205 B2 | 4/2002 | Cornett, Sr. | | |
| 7,390,024 B2 * | 6/2008 | Giordano | ........................ | 285/12 |

OTHER PUBLICATIONS

Catalog C-2000, 1999, p. 30, Simpson Strong-Tie Company, Inc., Pleasanton, California, USA.

* cited by examiner

*Primary Examiner* — Flemming Saether
(74) *Attorney, Agent, or Firm* — James R. Cypher; Charles R. Cypher

(57) ABSTRACT

A coupler nut with multiple bore diameters that are symmetrically stepped in both directions away from the center bore diameter. The bore diameter at the center is the smallest, and each pair of steps away from the center bore increases the bore diameter. This means that the coupler nut has no single, correct vertical orientation. It has no top or bottom, and as such is vertically ambidextrous.

17 Claims, 15 Drawing Sheets

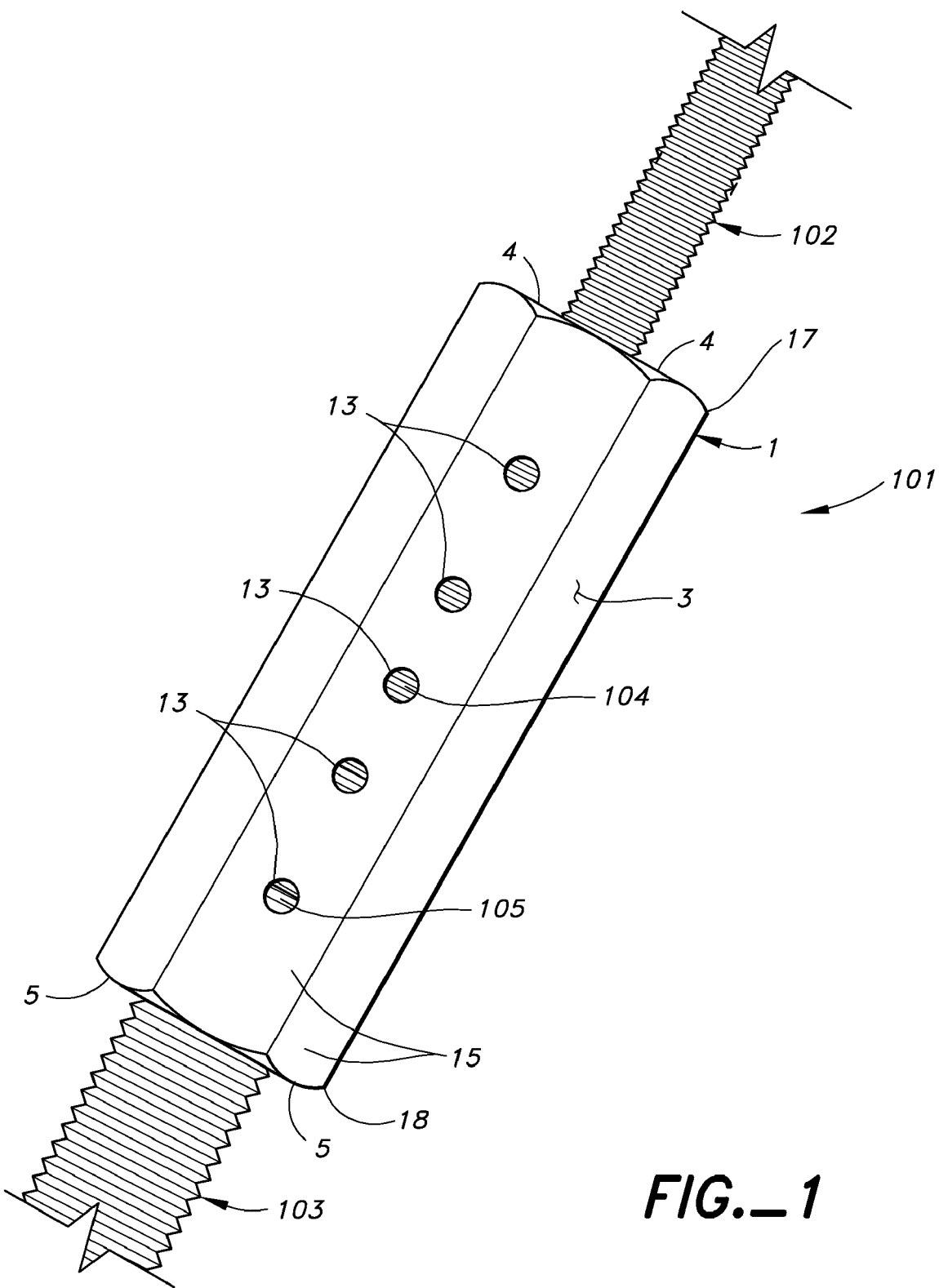
FIG._1

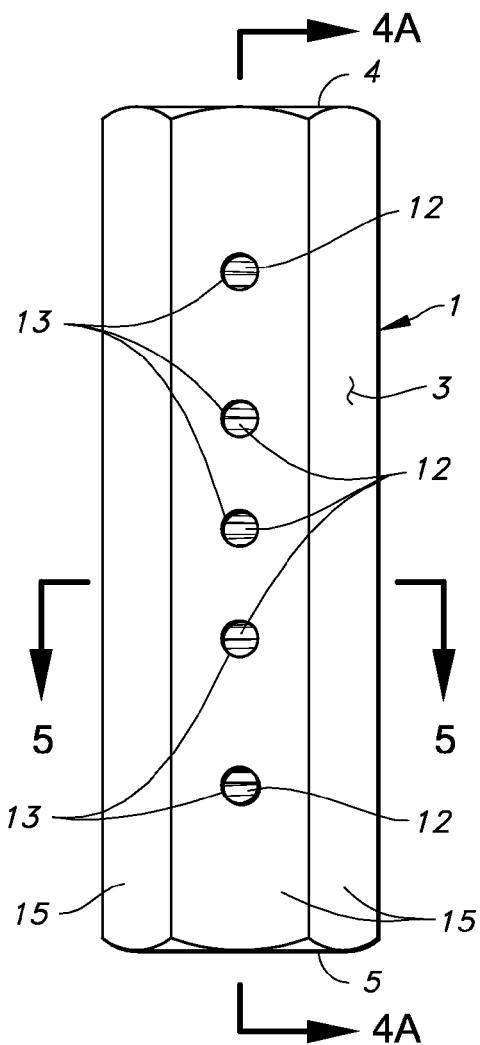
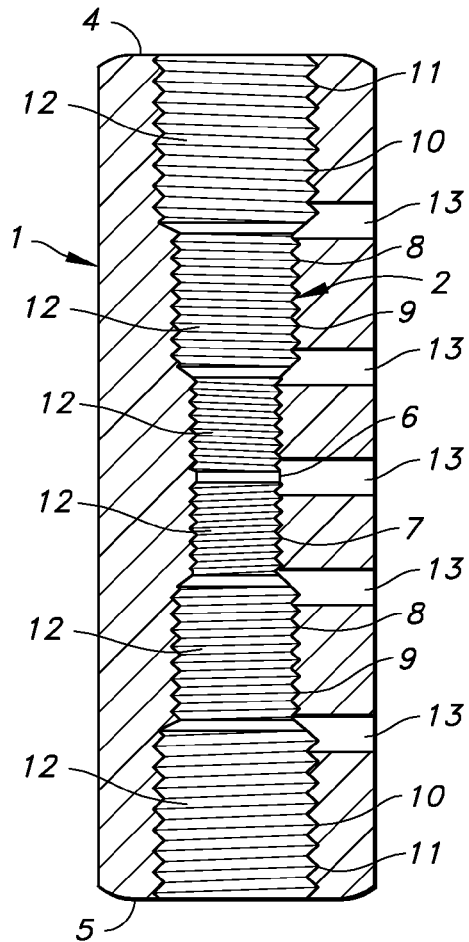
FIG._2
FIG._4A
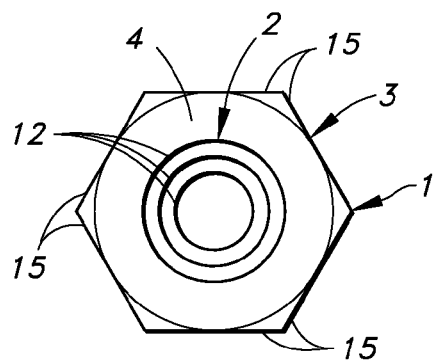
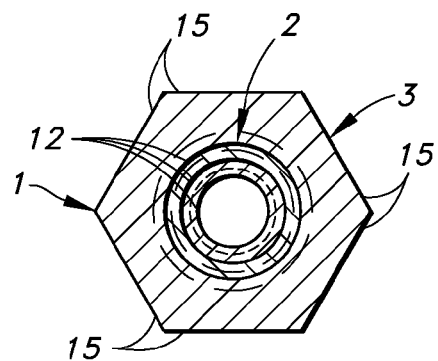
FIG._3
FIG._5

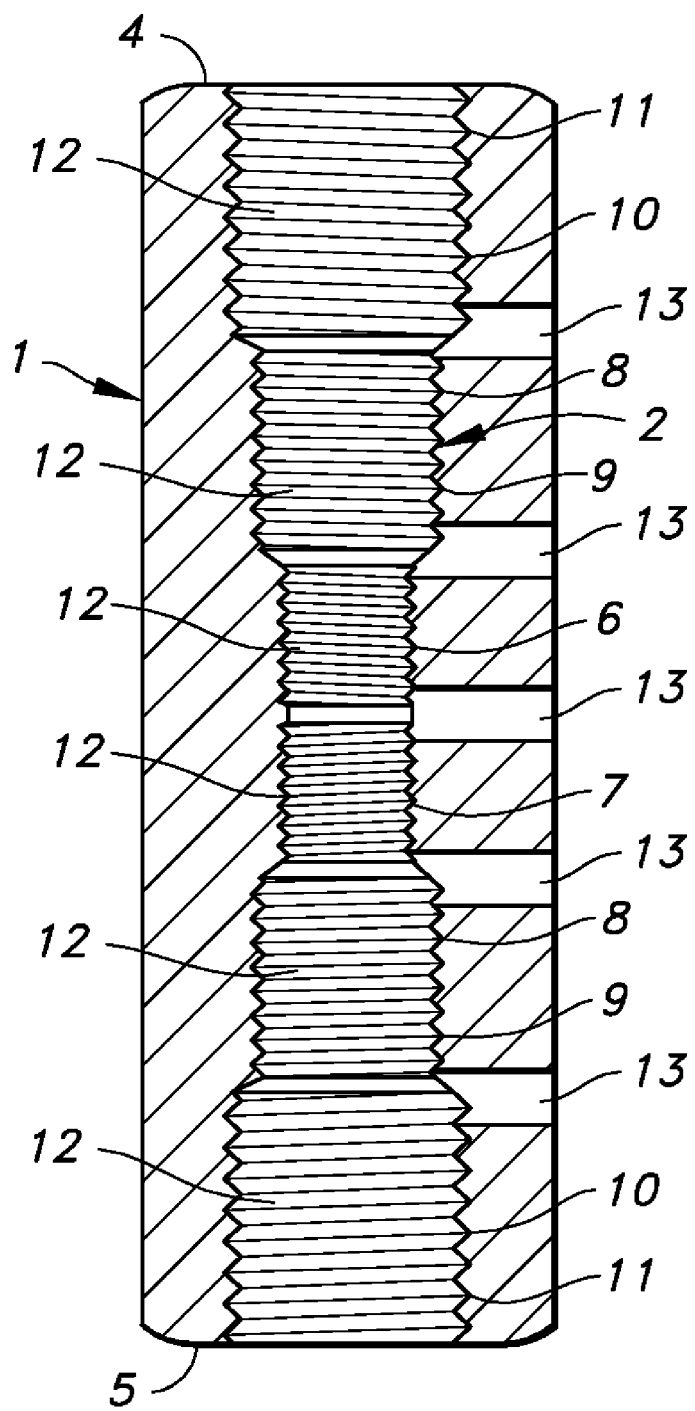
FIG._4B

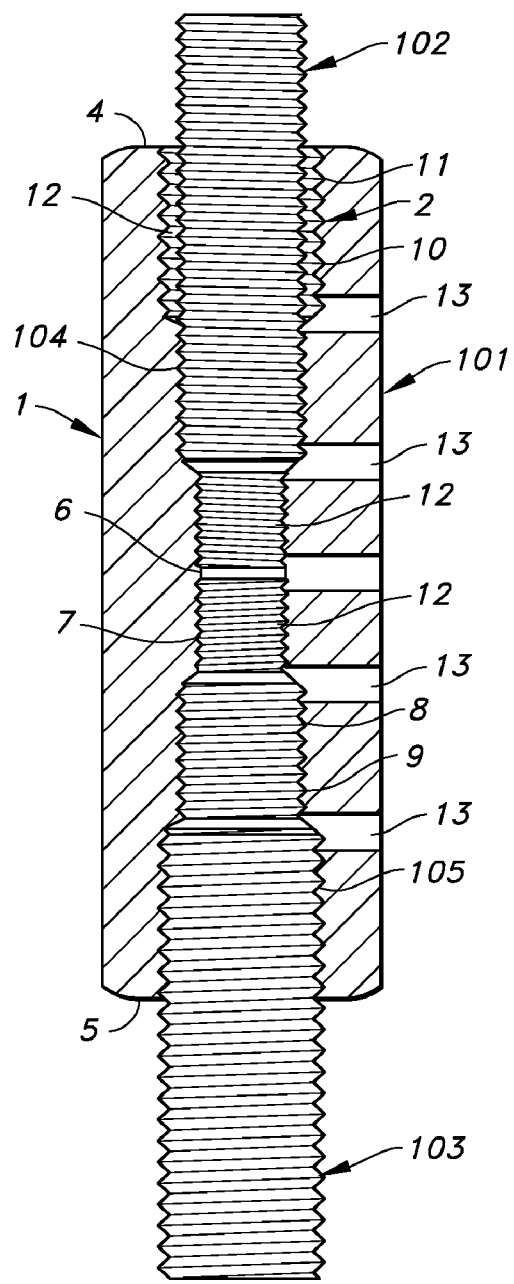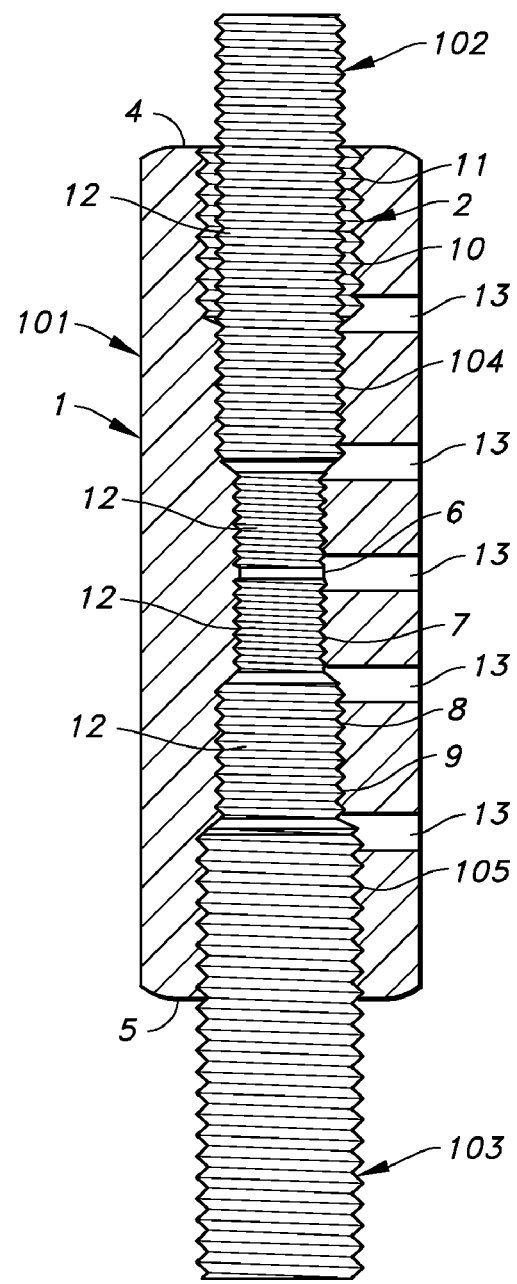
FIG._6A    FIG._6B

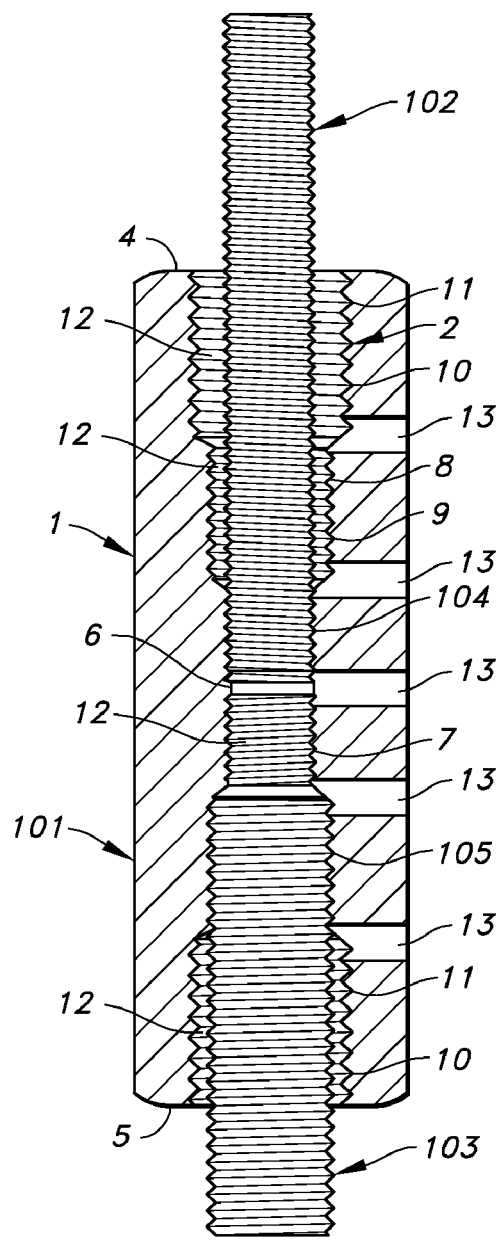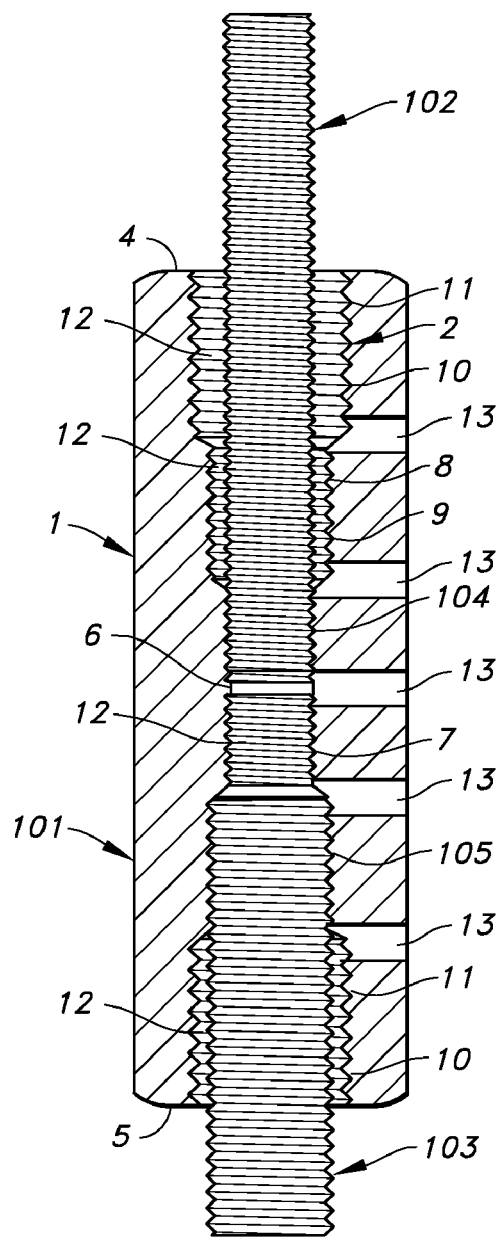
FIG._7A   FIG._7B

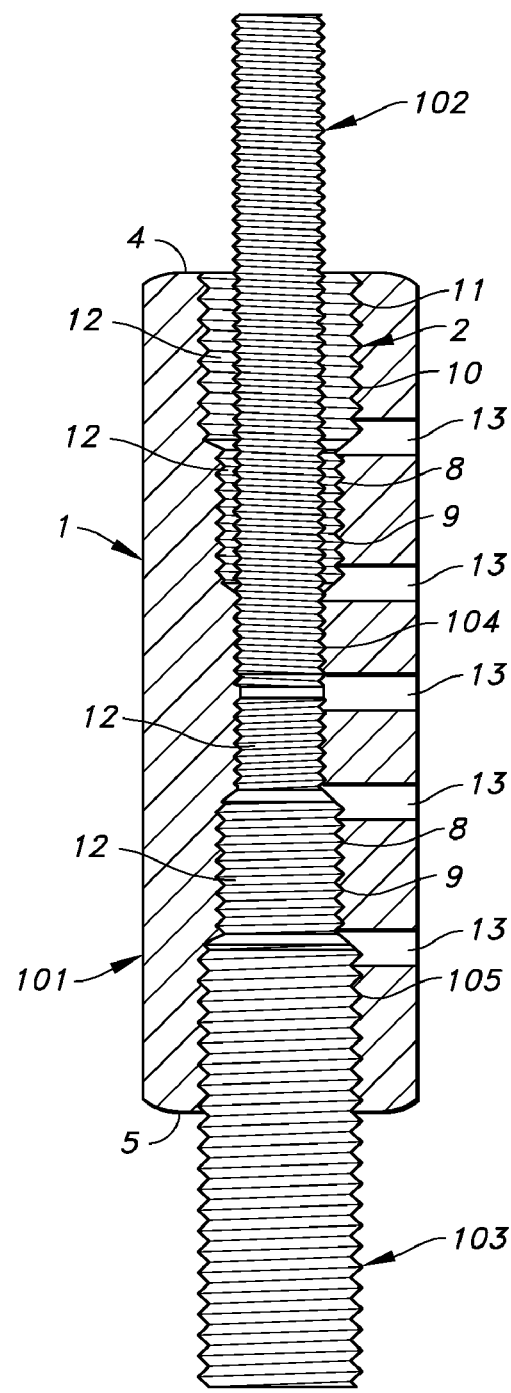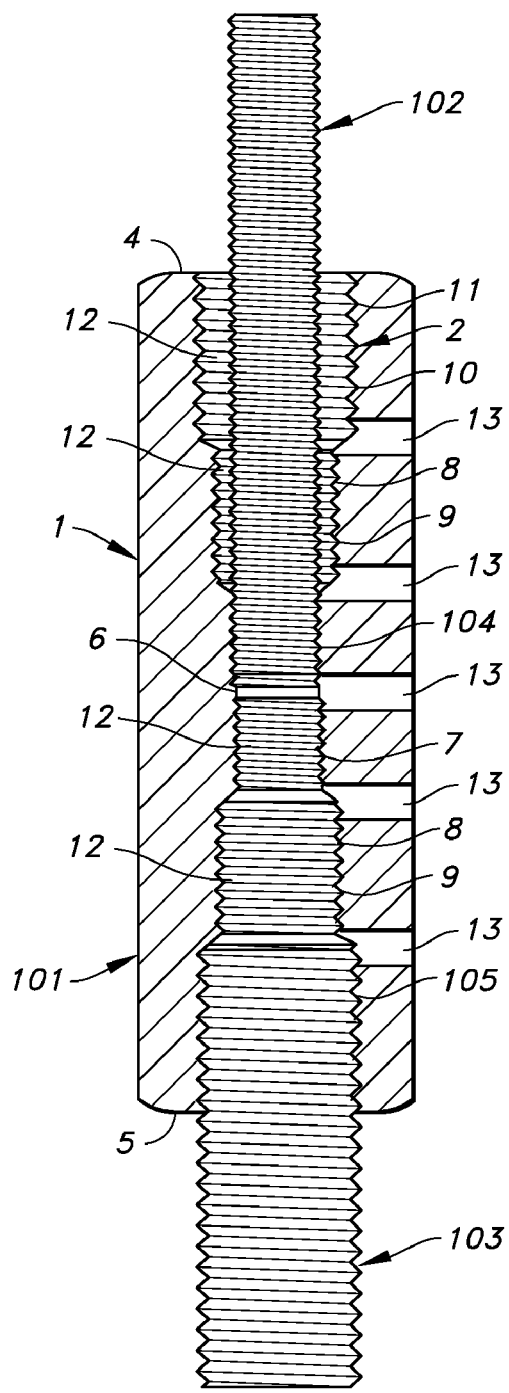
FIG._8A  FIG._8B

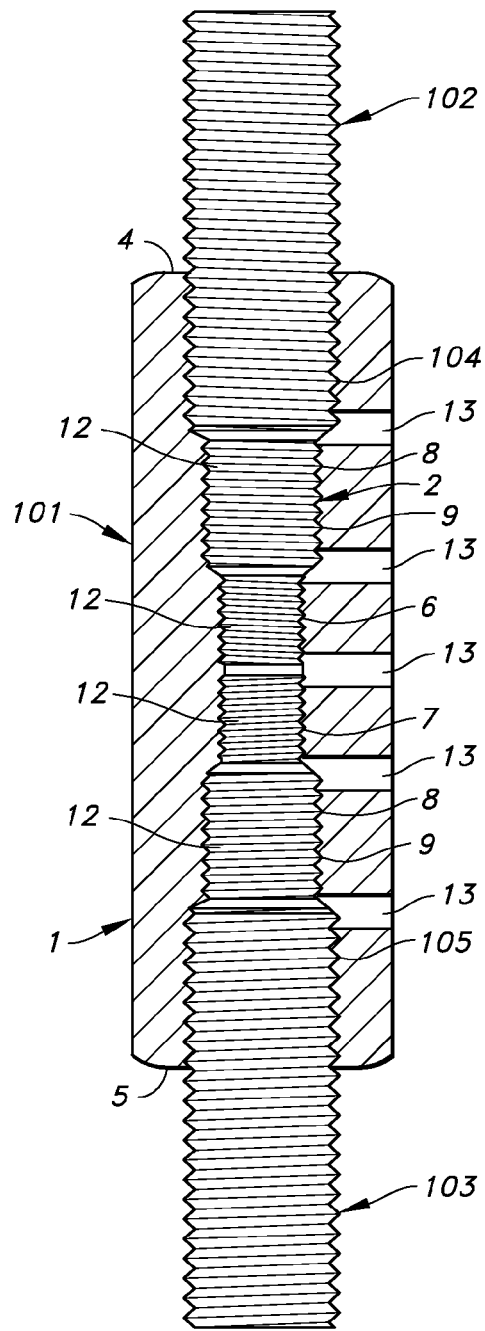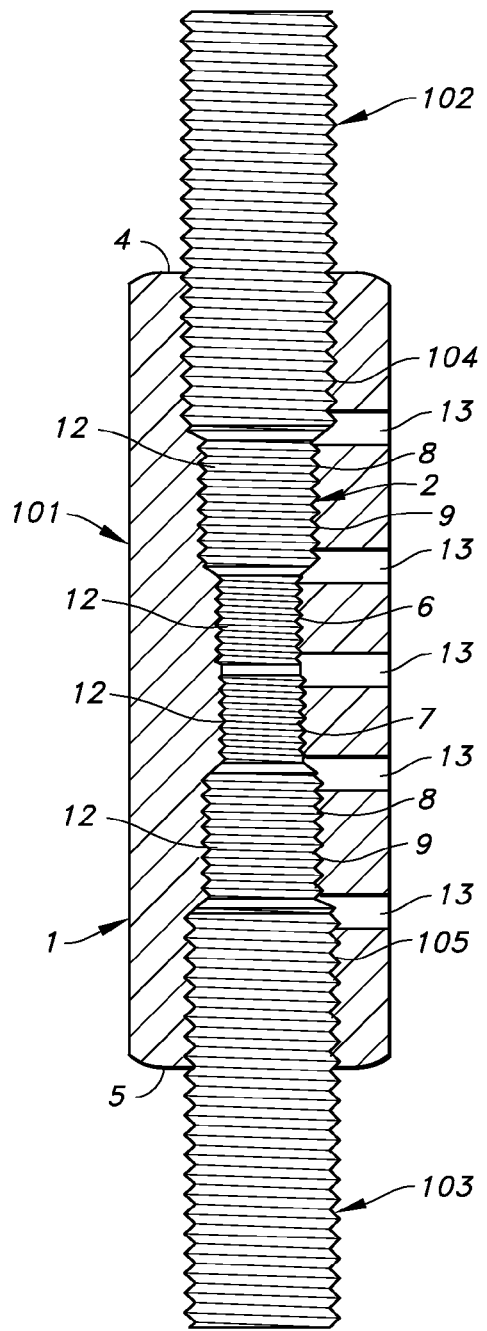
FIG._9A    FIG._9B

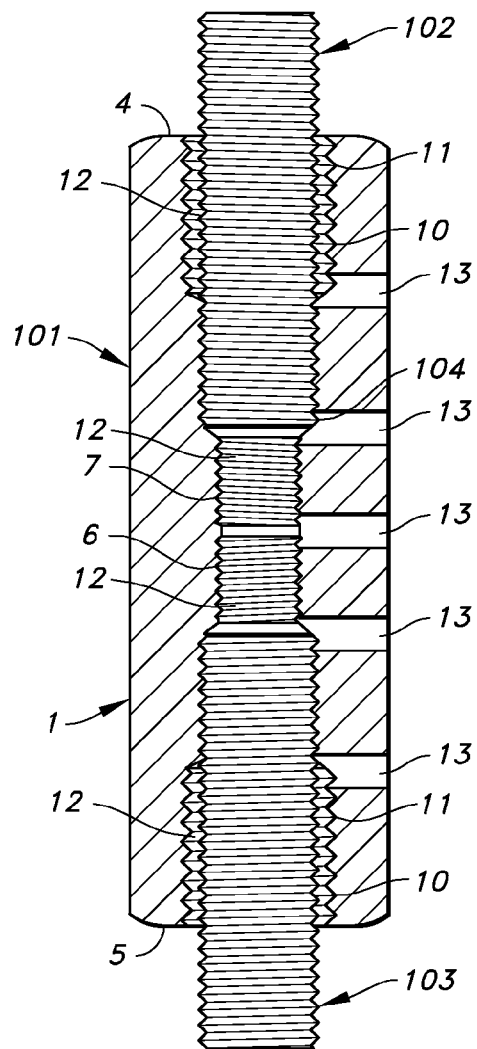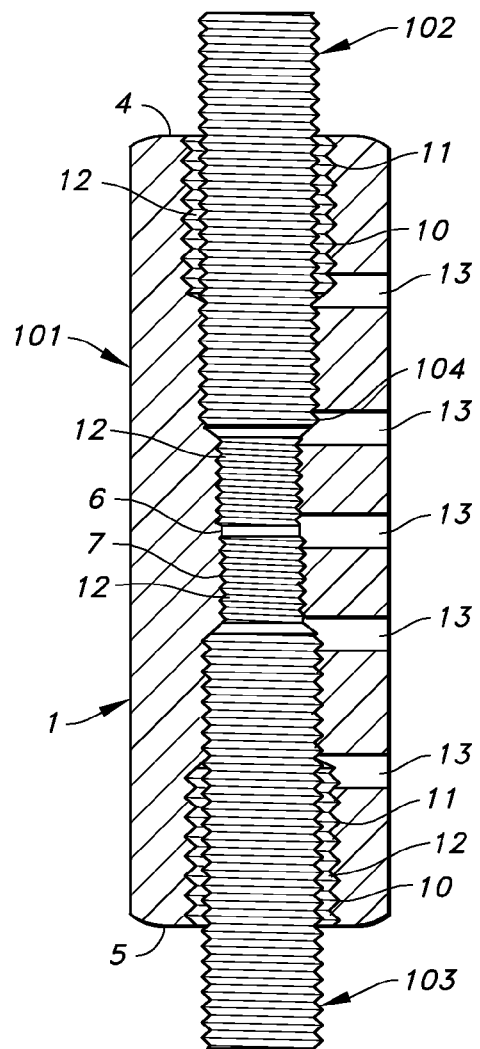
FIG._10A  FIG._10B

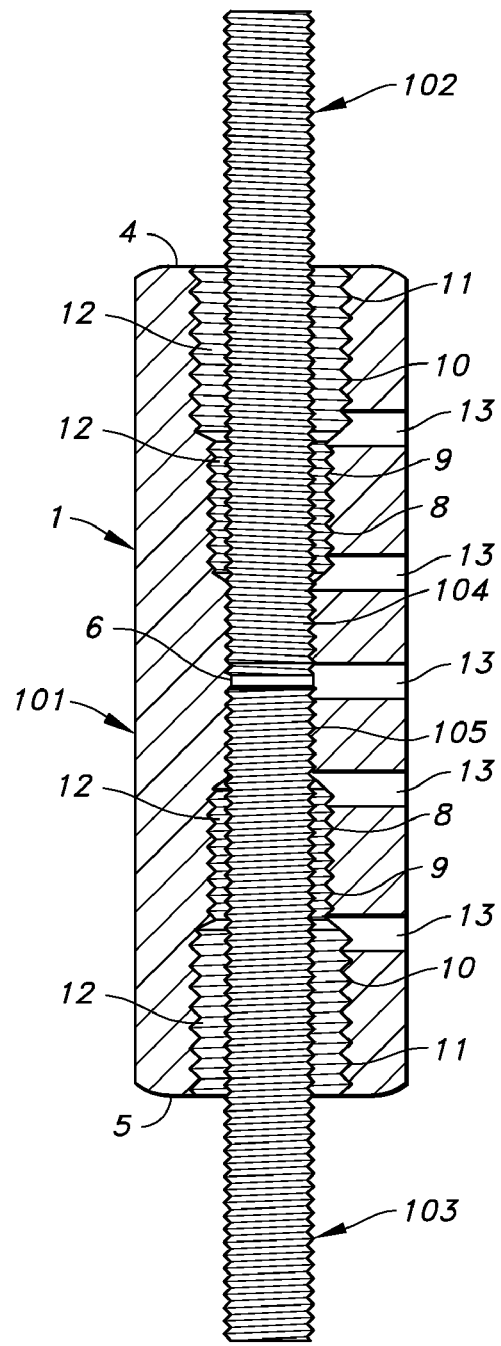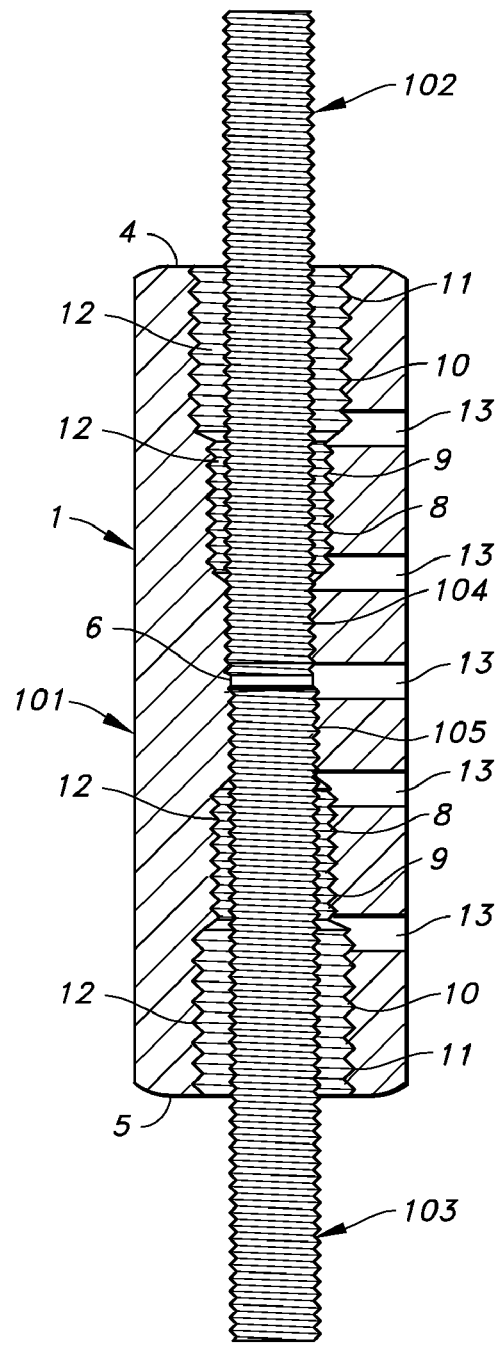
FIG._11A   FIG._11B

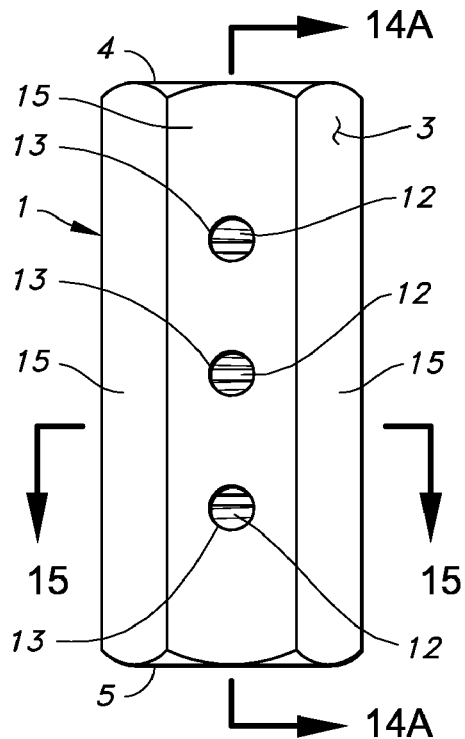
FIG._12
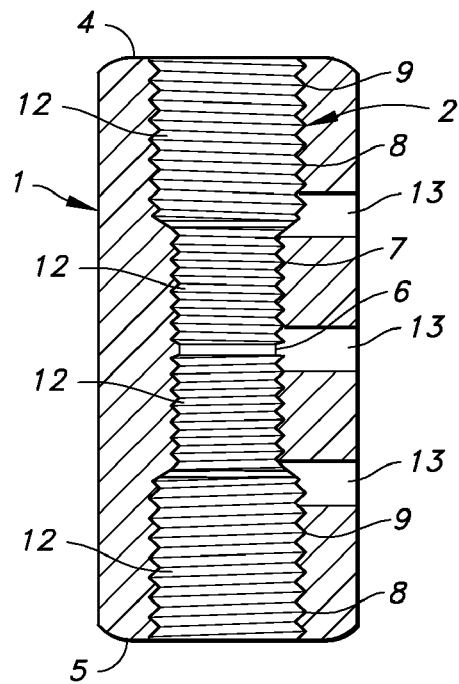
FIG._14A
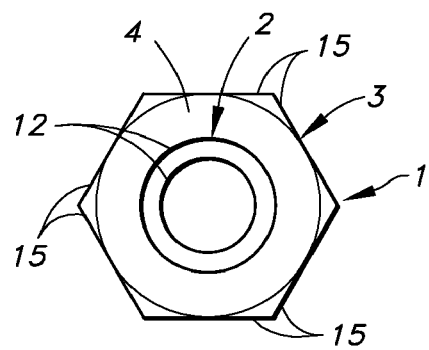
FIG._13
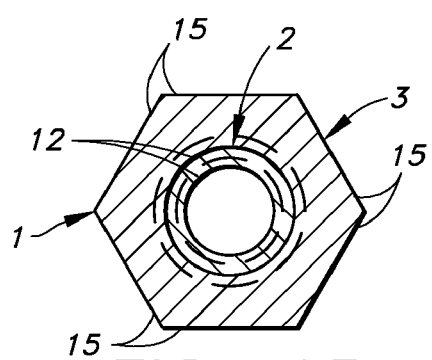
FIG._15
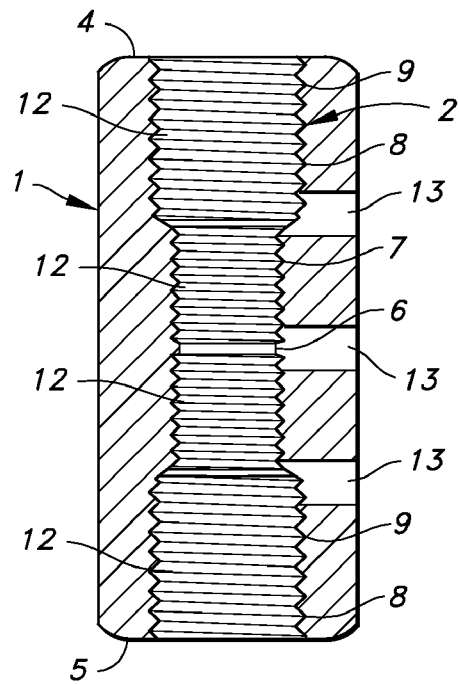
FIG._14B

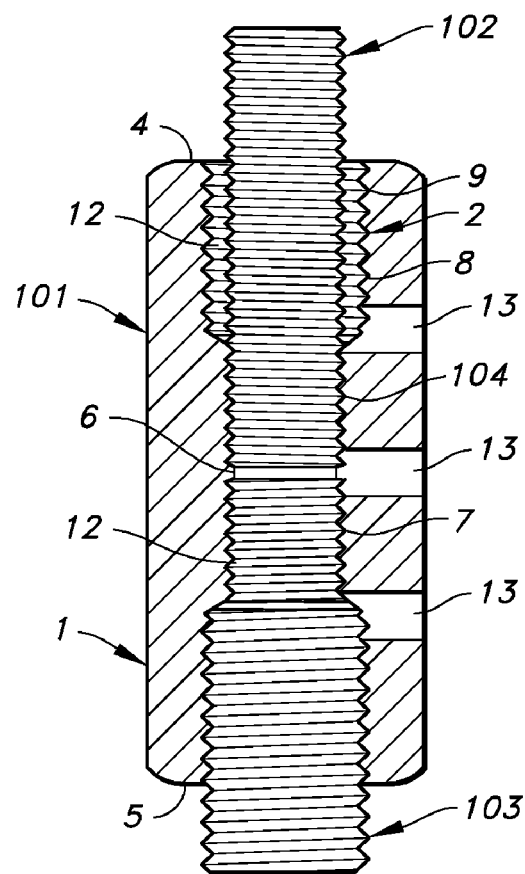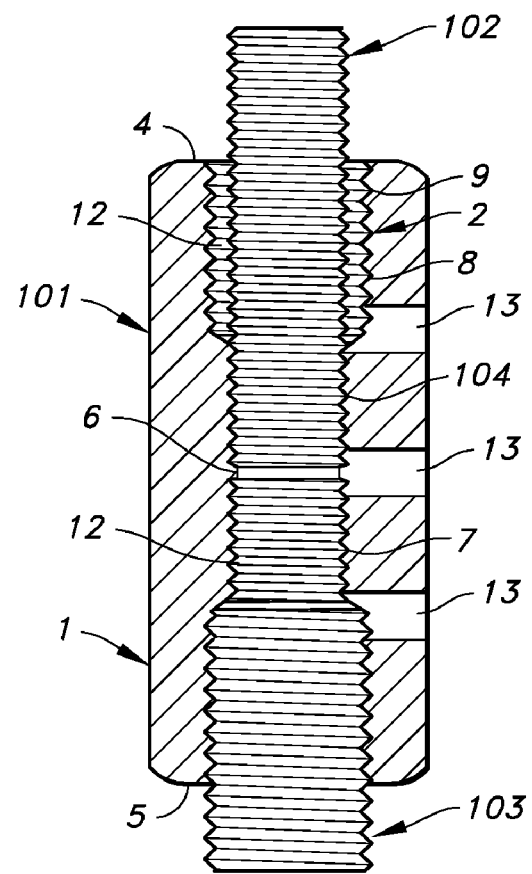
FIG._16A    FIG._16B

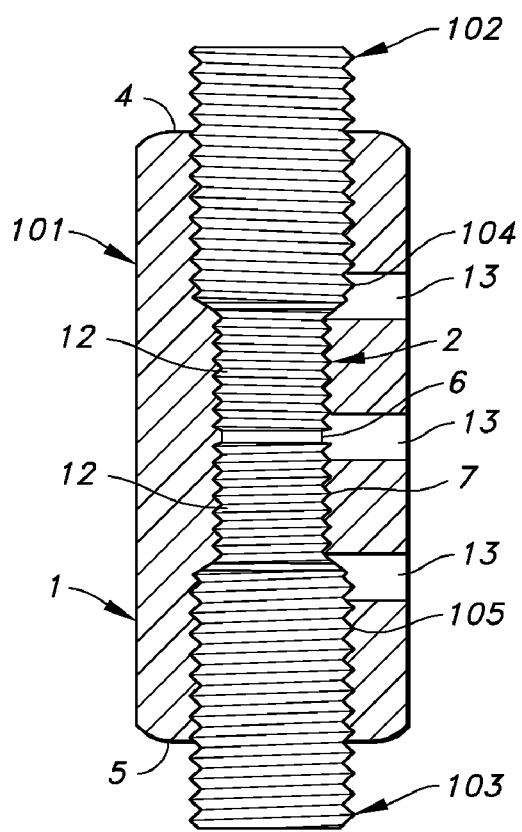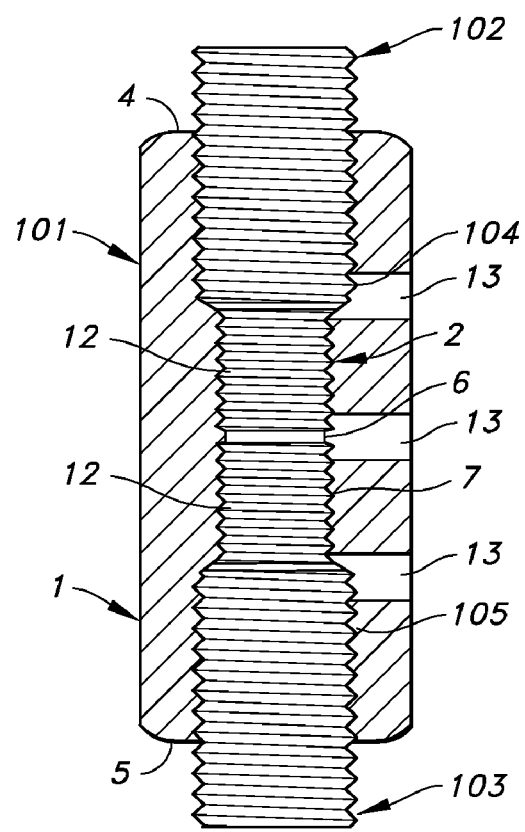
FIG._17A   FIG._17B

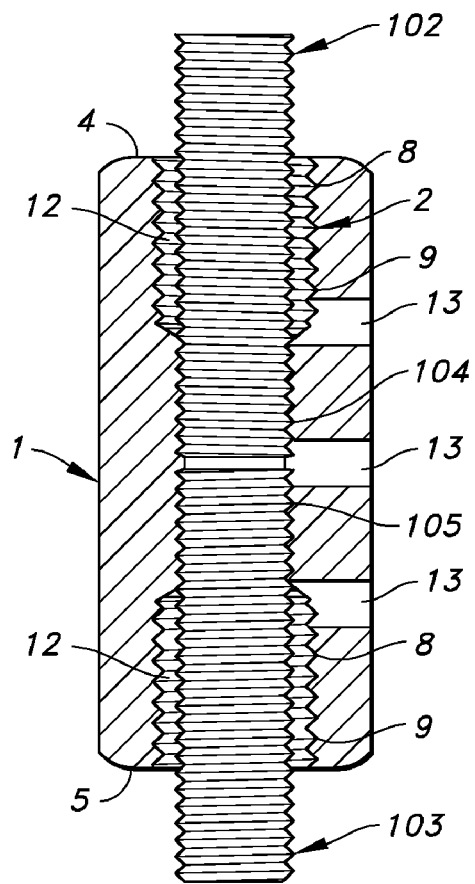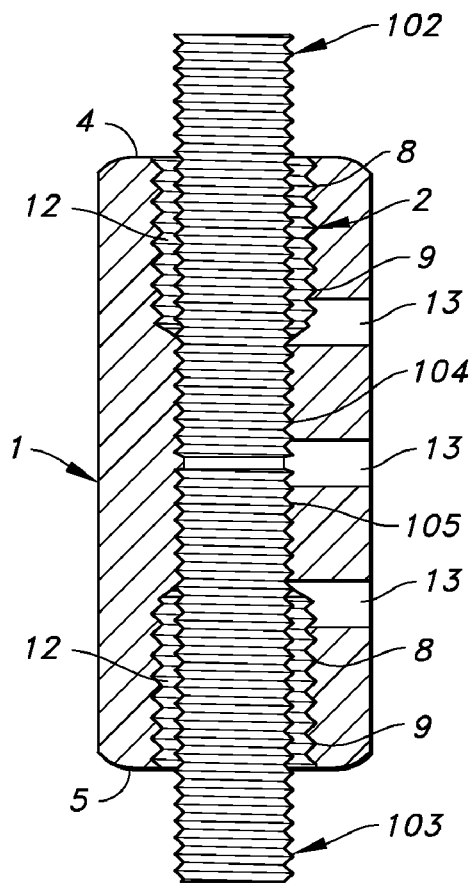
FIG._18A    FIG._18B

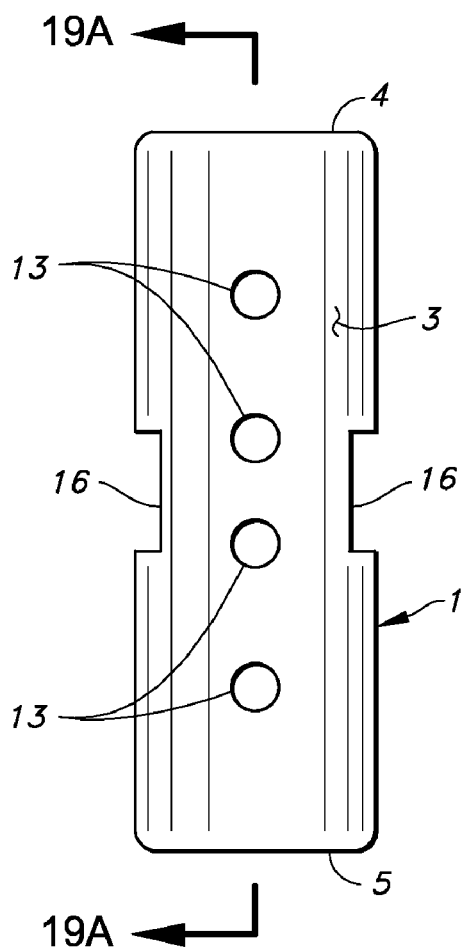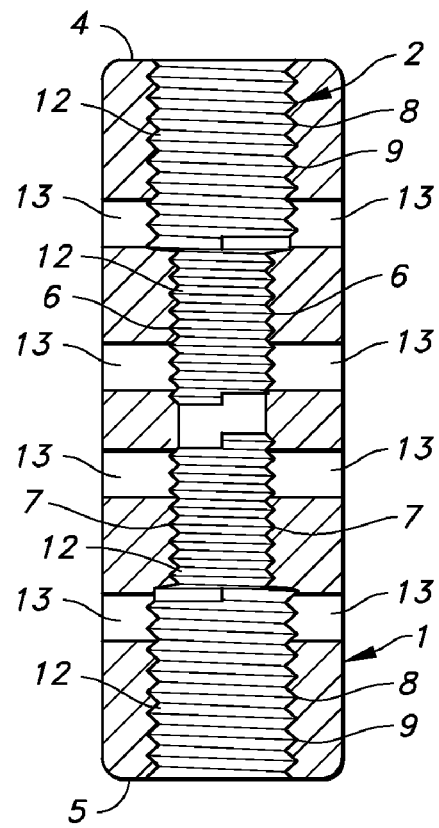
FIG._19      FIG._19A
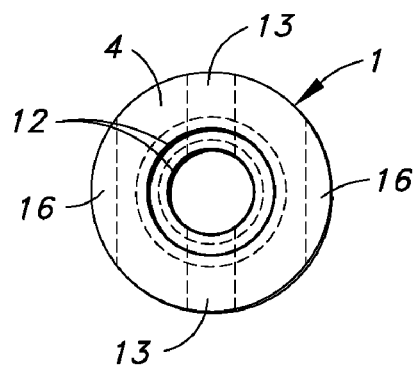
FIG._19B

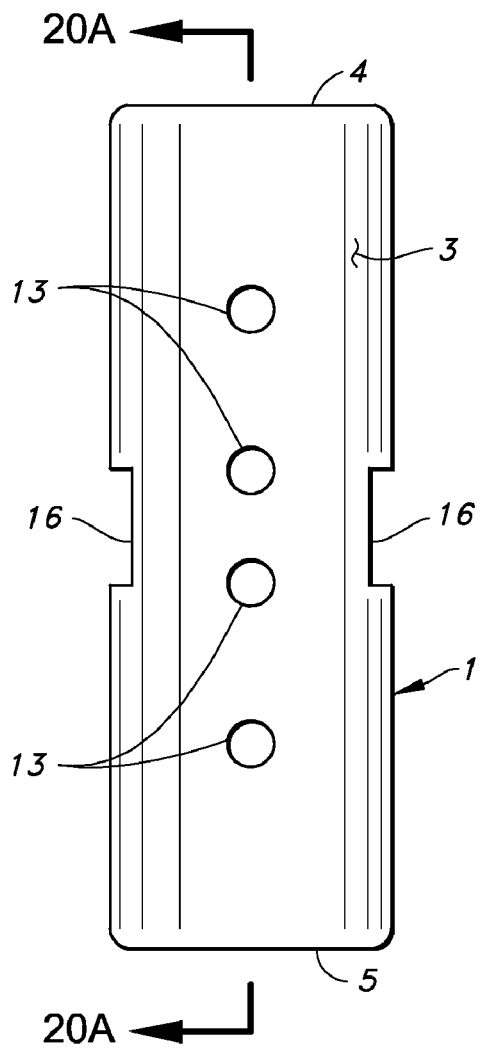
FIG._20
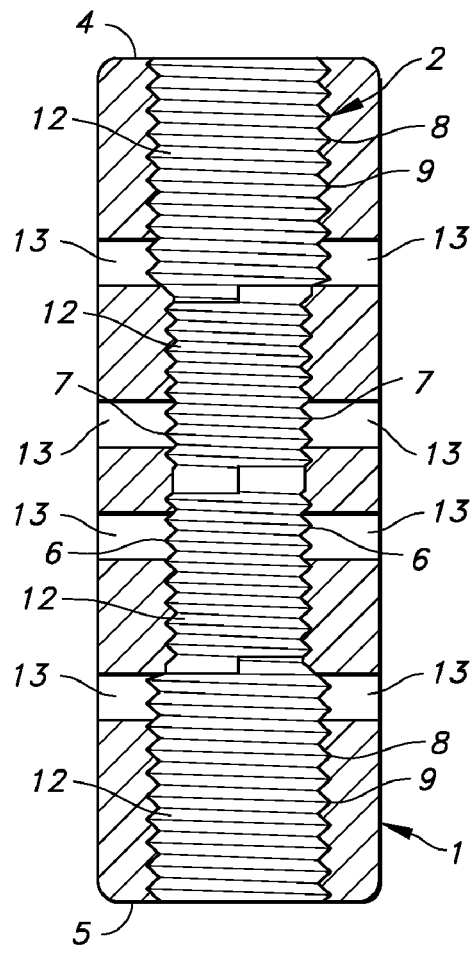
FIG._20A
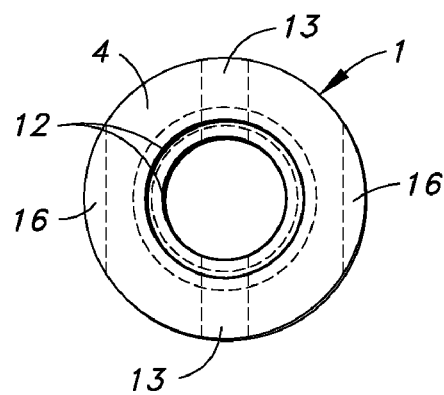
FIG._20B

SYMMETRICALLY STEPPED BORE COUPLER NUT

BACKGROUND OF THE INVENTION

The present invention relates to in-line joining of threaded rods in building construction. The rods can be "all thread" rods that are simply lengths of threaded rod, usually steel, bolts (e.g., anchor bolts that are embedded in concrete foundations), and combinations of the two. Holdown systems that link a series of threaded rods, from an anchor bolt through one or more threaded rods, are commonly used to secure a light frame building to the foundation walls or slab in high wind or earthquake prone regions. The anchor bolts pass from the concrete through holes in the mudsill, where they are typically tied to walls posts using holdown connectors. The threaded rods are connected with coupler nuts to the anchor bolts, and to each other in sequence with coupler nuts. The threaded rods pass through holes in the wall top plates up through the top story of the building, usually being secured at the bottom of each story and directly above the highest top plate. Because the uplift load reduces with elevation, the size of the threaded rods can also be reduced. For this reason, coupler nuts that allow one to connect threaded rods of different diameters are desirable. Coupler nuts that have two inner bore diameters are well-known, but these can only work in one orientation with respect to the connected rods. Furthermore, they can connect only two rods of two specific diameters that match the inner bore diameters of the coupler nut.

BRIEF SUMMARY OF THE INVENTION

The present invention improves on this prior art by providing a coupler nut with multiple bore diameters that are symmetrically stepped in both directions away from the center bore diameter. The bore diameter at the center is the smallest, and each pair of steps away from the center bore increases the bore diameter. This means that the coupler nut has no single, correct vertical orientation. It has no top or bottom, and as such is vertically ambidextrous.

BRIEF DESCRIPTION OF THE SEVERAL VIEWS OF THE DRAWING

FIG. 1 is a side elevation view of an embodiment of the connection of the present invention.

FIG. 2 is a side elevation view of an embodiment of the connector of the present invention.

FIG. 3 is a plan view of an embodiment of the connector of the present invention.

FIG. 4A is a cross-sectional elevation view of an embodiment of the connector of the present invention taken along line 4A-4A in FIG. 2.

FIG. 4B is a cross-sectional elevation view of an embodiment of the connector of the present invention.

FIG. 5 is a cross-sectional plan view of an embodiment of the connector of the present invention taken along line 5-5 in FIG. 2.

FIG. 6A is a cross-sectional elevation view of an embodiment of the connection of the present invention, in which the first threaded rod member is threaded into a second diameter in a second portion and the second threaded rod member is threaded into a third diameter in a third portion of an embodiment of the connector of the present invention, showing reverse threading.

FIG. 6B is a cross-sectional elevation view of an embodiment of the connection of the present invention, in which the first threaded rod member is threaded into a second diameter in a second portion and the second threaded rod member is threaded into a third diameter in a third portion of an embodiment of the connector of the present invention.

FIG. 7A is a cross-sectional elevation view of an embodiment of the connection of the present invention, in which the first threaded rod member is threaded into the first diameter in the first portion and the second threaded rod member is threaded into a second diameter in a second portion of an embodiment of the connector of the present invention, showing reverse threading.

FIG. 7B is a cross-sectional elevation view of an embodiment of the connection of the present invention, in which the first threaded rod member is threaded into the first diameter in the first portion and the second threaded rod member is threaded into a second diameter in a second portion of an embodiment of the connector of the present invention.

FIG. 8A is a cross-sectional elevation view of an embodiment of the connection of the present invention, in which the first threaded rod member is threaded into the first diameter in the first portion and the second threaded rod member is threaded into a second diameter in a second portion of an embodiment of the connector of the present invention, showing reverse threading.

FIG. 8B is a cross-sectional elevation view of an embodiment of the connection of the present invention, in which the first threaded rod member is threaded into the first diameter in the first portion and the second threaded rod member is threaded into a third diameter in a third portion of an embodiment of the connector of the present invention.

FIG. 9A is a cross-sectional elevation view of an embodiment of the connection of the present invention, in which the first threaded rod member is threaded into a third diameter in a third portion and the second threaded rod member is threaded into the other third diameter in the other third portion of an embodiment of the connector of the present invention, showing reverse threading.

FIG. 9B is a cross-sectional elevation view of an embodiment of the connection of the present invention, in which the first threaded rod member is threaded into a third diameter in a third portion and the second threaded rod member is threaded into the other third diameter in the other third portion of an embodiment of the connector of the present invention.

FIG. 10A is a cross-sectional elevation view of an embodiment of the connection of the present invention, in which the first threaded rod member is threaded into a second diameter in a second portion and the second threaded rod member is threaded into the other second diameter in the other second portion of an embodiment of the connector of the present invention, showing reverse threading.

FIG. 10B is a cross-sectional elevation view of an embodiment of the connection of the present invention, in which the first threaded rod member is threaded into a second diameter in a second portion and the second threaded rod member is threaded into the other second diameter in the other second portion of an embodiment of the connector of the present invention.

FIG. 11A is a cross-sectional elevation view of an embodiment of the connection of the present invention, in which the first threaded rod member is threaded into the first diameter in the first portion and the second threaded rod member is also threaded into the first diameter in the first portion of an embodiment of the connector of the present invention, showing reverse threading.

FIG. 11B is a cross-sectional elevation view of an embodiment of the connection of the present invention, in which the first threaded rod member is threaded into the first diameter in the first portion and the second threaded rod member is also threaded into the first diameter in the first portion of an embodiment of the connector of the present invention.

FIG. 12 is a side elevation view of an embodiment of the connector of the present invention.

FIG. 13 is a plan view of an embodiment of the connector of the present invention.

FIG. 14A is a cross-sectional elevation view of an embodiment of the connector of the present invention taken along line 14A-14A in FIG. 12, showing reverse threading.

FIG. 14B is a cross-sectional elevation view of an embodiment of the connector of the present invention.

FIG. 15 is a cross-sectional plan view of an embodiment of the connector of the present invention taken along line 15-15 in FIG. 12.

FIG. 16A is a cross-sectional elevation view of an embodiment of the connection of the present invention, in which the first threaded rod member is threaded into the first diameter in the first portion and the second threaded rod member is threaded into a second diameter in a second portion of an embodiment of the connector of the present invention, showing reverse threading.

FIG. 16B is a cross-sectional elevation view of an embodiment of the connection of the present invention, in which the first threaded rod member is threaded into the first diameter in the first portion and the second threaded rod member is threaded into a second diameter in a second portion of an embodiment of the connector of the present invention.

FIG. 17A is a cross-sectional elevation view of an embodiment of the connection of the present invention, in which the first threaded rod member is threaded into a second diameter in a second portion and the second threaded rod member is threaded into the other second diameter in the other second portion of an embodiment of the connector of the present invention, showing reverse threading.

FIG. 17B is a cross-sectional elevation view of an embodiment of the connection of the present invention, in which the first threaded rod member is threaded into a second diameter in a second portion and the second threaded rod member is threaded into the other second diameter in the other second portion of an embodiment of the connector of the present invention.

FIG. 18A is a cross-sectional elevation view of an embodiment of the connection of the present invention, in which the first threaded rod member is threaded into the first diameter in the first portion and the second threaded rod member is also threaded into the first diameter in the first portion of an embodiment of the connector of the present invention, showing reverse threading.

FIG. 18B is a cross-sectional elevation view of an embodiment of the connection of the present invention, in which the first threaded rod member is threaded into the first diameter in the first portion and the second threaded rod member is also threaded into the first diameter in the first portion of an embodiment of the connector of the present invention.

FIG. 19 is a side elevation view of an embodiment of the connector of the present invention.

FIG. 19A is a cross-sectional elevation view of an embodiment of the connector of the present invention taken along line 19A-19A in FIG. 19, showing reverse threading.

FIG. 19B is a cross-sectional plan view of an embodiment of the connector of the present invention.

FIG. 20 is a side elevation view of an embodiment of the connector of the present invention.

FIG. 20A is a cross-sectional elevation view of an embodiment of the connector of the present invention taken along line 20A-20A in FIG. 20, showing reverse threading.

FIG. 20B is a cross-sectional plan view of an embodiment of the connector of the present invention.

DETAILED DESCRIPTION OF THE INVENTION

As shown in FIG. 14A, the present invention is a coupler nut 1 with a first internal bore 2. The coupler nut 1 has a first outer wall 3, a first end 4, and a second end 5. The first internal bore 2 opens to the first end 4 and the second end 5. The first internal bore 2 has a first diameter 6 that occupies a first portion 7 of the first internal bore 2. Preferably, the first diameter 6 and the first portion 7 will be centered in the internal bore 2. The first internal bore 2 also has a pair of second diameters 8. The second diameters 8 at least partially occupy a pair of second portions 9 of the first internal bore 2. The second diameters 8 are greater than the first diameter 6. One of the said second diameters 8 is between the first diameter 6 and the first end 4. The other of the second diameters 8 is between the first diameter 6 and the second end 5. Preferably, the second diameters 8 are equal. Preferably, the first diameter 6 is ⅝" and the first portion is at least ⅝" long. Preferably, the second diameters 8 are ⅞" and the second portions 9 are at least ⅞" long. Preferably, the first and second ends 4 and 5 are chamfered, with a chamfer height of 0.083".

As shown in FIG. 4A, in another preferred embodiment, the first internal bore 2 has a pair of third diameters 10 that at least partially occupy a pair of third portions 11 of the first internal bore 2. The third diameters 10 are greater than the second diameters 8. One of the third diameters 10 is between one of the second diameters 8 and the first end 4. The other of the third diameters 10 is between the other of the second diameters 8 and the second end 5. Preferably, the third diameters 10 are equal. Preferably, the third diameters 10 are 1⅛" and the third portions 11 are at least 1⅛" long.

As shown in FIG. 4A and FIG. 14SA, preferably the first internal bore 2 is at least partially threaded with one or more threads 12. The threads 12 can be single, double or more, but single is preferred. The threads 12 can reverse, preferably in the middle of the first internal bore 2, but more preferably the threads are 12 are not reversed. Reversed threads 12 would permit the coupler nut 1 to draw together two similarly reverse-threaded objects, but that is not the preferred embodiment because reverse-threaded objects are not interchangeable and are consequently difficult to use. Preferably, the first diameter 6 is at least partially threaded with one or more threads 12. Also, the second diameters 8 are preferably at least partially threaded with one or more threads 12. If there are third diameters 10, the third diameters 10 are preferably at least partially threaded with one or more threads 12. In the preferred embodiment, all of the first internal bore 2 is threaded, but it is possible to have unthreaded portions so long as there are sufficient threads 12 to achieve the necessary connection to the joined threaded objects. Unthreaded portions could be anywhere within or at the junctures between the different diameters. Preferably, the thread pitch is 11 in the first diameter 6, 9 in the second diameters 8, and 7 in the third diameters 10. Preferably, the threads are ASME B1.1 UNC Class 2B.

As shown in FIG. 2 and FIG. 4A, the first outer wall 3 preferably has at least one opening 13 that opens to the first internal bore 2. The opening allows one to check to see whether, and how far, an object has been threaded into the first internal bore 2. Preferably, the first outer wall 3 has at least one opening 13 that opens to the first diameter 6 and at least one opening 13 that opens to each of the second diameters 8, for a total of at least three openings 13. If there are third diameters 8, the first outer wall 3 preferably has at least one opening 13 that opens to the first diameter 6, at least one opening 13 that openings to each of the second diameters 8, and at least one opening 13 that opens to each of the third diameters 8, for a total of at least five openings 13. Preferably, the openings 13 are 0.187" in diameter and/or 0.25" in diameter.

Preferably, the first outer wall 3 has a circumference 14 that is at least partially hexagonal, defining six substantially flat faces 15. Nuts conventionally have either a hexagonal circumference 14, or a square circumference 14, allowing them to be gripped and turned with wrenches. Conventionally, only smaller nuts have a square circumference 14, as the excess material with a larger nut would disadvantageously add both materials cost and weight. Preferably, the coupler nut 1 is made from ASTM A563 GRADE B steel. Preferably, it is lathe-cut.

As shown in FIG. 16A, the present invention is also the coupler nut 1 connection 101 between a first threaded rod member 102 and a second threaded rod member 103. The coupler nut 1 preferably has a first internal bore 2, a first outer wall 3, a first end 4, and a second end 5. The first internal bore 2 preferably has a first diameter 6 that occupies a first portion 7 of the first internal bore 2. Preferably, the first internal bore 2 has a pair of second diameters 8 that at least partially occupy a pair of second portions 9 of the first internal bore 2. The second diameters 8 are preferably greater than the first diameter 6. Preferably, one of the second diameters 8 is between the first diameter 6 and the first end 4. Preferably, the other of the second diameters 8 is between the first diameter 6 and the second end 5. The first threaded rod member 102 preferably has a first threaded end 104, and the first threaded end 104 is threaded into the first internal bore 2 through the first end 4 of the coupler nut. Preferably, the second threaded rod member 103 has a first threaded end 105, and the first threaded end 105 is threaded into the first internal bore 2 through the second end 5 of the coupler nut 1. The threaded rod members 102 and 103 can be all-thread rod, bolts, anchor bolts, holdowns, or any combination of these and other threaded rod members 102 and 103.

The basic purpose of the present invention is to allow threaded rod members 102 and 103 of different matching, and different non-matching, sizes to be connected by a single multiuse coupler nut 1.

In a preferred embodiment of the connection 101, the first threaded end 104 of the first threaded rod member 102 is threaded into the first diameter 6 of the coupler nut 1. The first threaded end 105 of the second threaded rod member 103 is threaded into the first diameter 6 of the coupler nut 1.

In a further preferred embodiment of the connection 101, the first threaded end 104 of the first threaded rod member 102 is threaded into the first diameter 6 of the coupler nut 1. The first threaded end 105 of the second threaded rod member 103 is threaded into one of the second diameters 8 of the coupler nut 1.

In a still further preferred embodiment of the connection 101, the first threaded end 104 of the first threaded rod member 102 is threaded into one of the second diameters 8 of the coupler nut 1. The first threaded end 105 of the second threaded rod member 103 is threaded into the other of the second diameters 8 of the coupler nut 1.

In another preferred embodiment of the connection 101, the first internal bore 2 has a pair of third diameters 10 that at least partially occupy a pair of third portions 11 of the first internal bore 2. The third diameters 10 are greater than the second diameters 8. One of the third diameters 10 is between one of the second diameters 8 and the first end 4, and one of the third diameters 10 is between the other of the second diameters 8 and the second end 5.

In a further preferred embodiment of the connection 101, the first threaded end 104 of the first threaded rod member 102 is threaded into the first diameter 6 of the coupler nut 1. The first threaded end 105 of the second threaded rod member 103 is threaded into one of the third diameters 10 of said coupler nut 1.

In a still further preferred embodiment of the connection 101, the first threaded end 104 of the first threaded rod member 102 is threaded into one of the second diameters 8 of the coupler nut 1. The first threaded end 105 of the second threaded rod member 103 is threaded into one of the third diameters 10 of the coupler nut 1.

In a still further preferred embodiment of the connection 101, the first threaded end 104 of the first threaded rod member 102 is threaded into one of the third diameters 10 of the coupler nut 1. The first threaded end 105 of the second threaded rod member 103 is threaded into the other of the third diameters 10 of the coupler nut 1.

Two sizes of an alternate preferred embodiment of the coupler nut 1 are shown in drawing FIGS. 19-20B. In this embodiment, the majority of the first outer wall 3 is round rather than hexagonal in circumference. Instead of six flat faces 15, the outer wall 3 has two flat-faced indented portions 16 midway between the first end 4 and the second end 5. These provide purchase for a wrench.

In the smaller of the two sizes of this alternate preferred embodiment, the total height of the coupler nut 1, measured from the first end 4 to the second end 5, is 3.750 inches. There are eight circular openings 13 lined up in two opposing lines of four openings 13 each in the outer wall 3. These openings 13 are drilled and are 0.250 inches in diameter. The distance from the first end 4 to the center of the nearest pair of openings 13 is 0.850 inches; the distance from the first end 4 to the center of the next nearest pair of openings 13 is 1.600 inches. Likewise, the distance from the second end 5 to the center of the nearest pair of openings 13 is 0.850 inches; the distance from the second end 5 to the center of the next nearest pair of openings 13 is 1.600 inches. The distance from the first end 4 and the second end to the indented portions 16 is 1.562 inches. The distance between the two indented portions 16 is 1.015 inches. The outer diameter of the coupler nut 1 is 1.250 inches. The juncture 17 between the first outer wall 3 and the first end 4 is rounded with a radius of 0.100 inches; the juncture 18 between the first outer wall 3 and the second end 5 is rounded with a radius of 0.100 inches. The first diameter 6 is nominally 0.547 inches. The second diameters 8 are nominally 0.780 inches. The second diameters 8 are drilled to a depth of 1.000 inches. The distance between the second diameters 8, and the depth of the first diameter 6, is 1.750 inches. The depth of the threads 12 of the second diameters 8 is 0.990 inches. The threads 12 of the first diameter 6 is split into two portions each having a depth of 0.812 inches, separated by an unthreaded portion of 0.026 inches. The threads 12 of the second diameters 8 are ⅞-9 UNC-1B. The threads 12 of the first diameter 6 are ⅝-11 UNC-1B.

In the larger of the two sizes of this alternate preferred embodiment, the total height of the coupler nut 1, measured from the first end 4 to the second end 5, is 4.500 inches. There are eight circular openings 13 lined up in two opposing lines of four openings 13 each in the outer wall 3. These openings 13 are drilled and are 0.250 inches in diameter. The distance from the first end 4 to the center of the nearest pair of openings 13 is 1.090 inches; the distance from the first end 4 to the center of the next nearest pair of openings 13 is 1.950 inches. Likewise, the distance from the second end 5 to the center of the nearest pair of openings 13 is 1.090 inches; the distance from the second end 5 to the center of the next nearest pair of openings 13 is 1.950 inches. The distance from the first end 4 and the second end to the indented portions 16 is 1.938 inches. The distance between the two indented portions 16 is 1.265 inches. The outer diameter of the coupler nut 1 is 1.500 inches. The juncture 17 between the first outer wall 3 and the first end 4 is rounded with a radius of 0.100 inches; the juncture 18 between the first outer wall 3 and the second end 5 is rounded with a radius of 0.100 inches. The first diameter 6 is nominally 0.781 inches. The second diameters 8 are nominally 0.980 inches. The second diameters 8 are drilled to a depth of 1.250 inches. The distance between the second diameters 8, and the depth of the first diameter 6, is 2.000 inches. The depth of the threads 12 of the second diameters 8 is 1.240 inches. The threads 12 of the first diameter 6 is split into two portions each having a depth of 0.975 inches, separated by an unthreaded portion of 0.050 inches. The threads 12 of the second diameters 8 are 1⅛-7 UNC-1B. The threads 12 of the first diameter 6 are ⅞-9 UNC-1B.

Number List 1. coupler nut
2. first internal bore (of 1)
3. first outer wall (of 1)
4. first end (of 1)
5. second end (of 1)
6. first diameter (of 2)
7. first portion (of 2)
8. second diameters (of 2)
9. second portions (of 2)
10. third diameters (of 2)
11. third portions (of 2)
12. threads (of 2, 6, 8 and/or 10)
13. opening (of 3)
14. circumference (of 3)
15. flat faces (of 3)
16. flat-faced indents (of 1)
17. juncture (between 3 and 4)
18. juncture (between 3 and 5)
101. connection
102. first threaded rod member
103. second threaded rod member
104. first threaded end (of 102)
105. first threaded end (of 103)

I claim:

1. A coupler nut (1) with a first internal bore (2), said coupler nut (1) comprising:
 a. a first outer wall (3);
 b. a first end (4);
 c. a second end (5);
 d. said first internal bore (2), wherein:
  i. said first internal bore (2) has a first diameter (6) that occupies a first portion (7) of said first internal bore (2);
  ii. said first internal bore (2) has a pair of second diameters (8) that at least partially occupy a pair of second portions (9) of said first internal bore (2), second diameters (8) being greater than said first diameter (6), one of said second diameters (8) being between said first diameter (6) and said first end (4), and the other of said second diameters (8) being between said first diameter (6) and said second end (5); and
  iii. said first outer wall (3) has at least one opening (13) that opens to said first internal bore (2) and to said first diameter (6) and at least one opening (13) that opens to each of said second diameters (8).

2. The coupler nut (1) of claim 1, wherein:
 a. said second diameters (8) are equal.

3. The coupler nut (1) of claim 1, wherein:
 a. said first internal bore (2) has a pair of third diameters (10) that at least partially occupy a pair of third portions (11) of said first internal bore (2), said third diameters (10) being greater than said second diameters (8), one of said third diameters (10) being between one of said second diameters (8) and said first end (4), and the other of said third diameters (10) being between the other of said second diameters (8) and said second end (5), and said first outer wall (3) has at least one opening (13) that opens to each of said third diameters (8).

4. The coupler nut (1) of claim 3, wherein:
 a. said third diameters (1 0) are equal.

5. The coupler nut (1) of claim 3, wherein:
 a. said third diameters (1 0) are at least partially threaded with one or more threads (12).

6. The coupler nut (1) of claim 1, wherein:
 a. said first internal bore (2) is at least partially threaded with one or more threads (12).

7. The coupler nut (1) of claim 6, wherein:
 a. said first diameter (6) is at least partially threaded with one or more threads (12).

8. The coupler nut (1) of claim 7, wherein:
 a. said second diameters (8) are at least partially threaded with one or more threads (12).

9. The coupler nut (1) of claim 1, wherein:
 a. said first outer wall (3) has a circumference (14) that is at least partially hexagonal, defining six substantially flat faces (15).

10. A connection (101) between a first threaded rod member (102) and a second threaded rod member (103), said connection (101) comprising:
 a. a coupler nut (1) having:
  i. a first internal bore (2);
  ii. a first outer wall (3);
  iii. a first end (4);
  iv. a second end (5), wherein:
 b. said first internal bore (2) has a first diameter (6) that occupies a first portion (7) of said first internal bore (2);
 c. said first internal bore (2) has a pair of second diameters (8) that at least partially occupy a pair of second portions (9) of said first internal bore (2), said second diameters (8) being greater than said first diameter (6), one of said second diameters (8) being between said first diameter (6) and said first end (4), and the other of said second diameters (8) being between said first diameter (6) and said second end (5), and said first outer wall (3) has at least one opening (13) that opens to said first internal bore (2) and to said first diameter (6) and at least one opening (13) that opens to each of said second diameters (8);
 d. said first threaded rod member (102) having a first threaded end (104), said first threaded end (104) being threaded into said first internal bore (2) through said first end (4) of said coupler nut (1); and
 e. said second threaded rod member (103) having a first threaded end (105), said first threaded end (105) being threaded into said first internal bore (2) through said second end (5) of said coupler nut (1).

11. The connection (101) of claim 10, wherein:
 a. said first threaded end (104) of said first threaded rod member (102) is threaded into said first diameter (6) of said coupler nut (1); and b. said first threaded end (105) of said second threaded rod member (103) is threaded into said first diameter (6) of said coupler nut (1).

12. The connection (101) of claim 10, wherein:
a. said first threaded end (104) of said first threaded rod member (102) is threaded into said first diameter (6) of said coupler nut (1); and
b. said first threaded end (105) of said second threaded rod member (103) is threaded into one of said second diameters (8) of said coupler nut (1).

13. The connection (101) of claim 10, wherein:
a. said first threaded end (104) of said first threaded rod member (102) is threaded into one of said second diameters (8) of said coupler nut (1); and
b. said first threaded end (105) of said second threaded rod member (103) is threaded into the other of said second diameters (8) of said coupler nut (1).

14. The connection (101) of claim 10, wherein:
a. said first internal bore (2) has a pair of third diameters (10) that at least partially occupy a pair of third portions (11) of said first internal bore (2), said third diameters (10) being greater than said second diameters (8), one of said third diameters (10) being between one of said second diameters (8) and said first end (4), and one of said third diameters (10) being between the other of said second diameters (8) and said second end (5), and said first outer wall (3) has at least one opening (13) that opens to each of said third diameters (8).

15. The connection (101) of claim 14, wherein:
a. said first threaded end (104) of said first threaded rod member (102) is threaded into said first diameter (6) of said coupler nut (1); and
b. said first threaded end (105) of said second threaded rod member (103) is threaded into one of said third diameters (10) of said coupler nut (1).

16. The connection (101) of claim 14, wherein:
a. said first threaded end (104) of said first threaded rod member (102) is threaded into one of said second diameters (8) of said coupler nut (1); and
b. said first threaded end (105) of said second threaded rod member (103) is threaded into one of said third diameters (10) of said coupler nut (1).

17. The connection (101) of claim 14, wherein:
a. said first threaded end (104) of said first threaded rod member (102) is threaded into one of said third diameters (10) of said coupler nut (1); and
b. said first threaded end (105) of said second threaded rod member (103) is threaded into the other of said third diameters (10) of said coupler nut (1).

* * * * *